United States Patent Office 2,876,265
Patented Mar. 3, 1959

2,876,265

PROCESS OF PREPARATION OF UNSATURATED HIGHER ALIPHATIC ALCOHOLS

Frederic Francois Albert Braconier, Plainevaux, and Henri Le Bihan and Raymond Arnould, Liege, Belgium, assignors to Societe Belge de l'Azote et des Produits Chimiques du Marly, Liege, Belgium No Drawing. Application July 3, 1956
Serial No. 595,597

Claims priority, application Belgium August 2, 1955

4 Claims. (Cl. 260—638)

This invention relates to improved processes for the preparation of unsaturated higher aliphatic alcohols by hydrogenating corresponding free unsaturated fatty acids or their derivatives such as their esters of monovalent or polyvalent alcohols.

Higher aliphatic alcohols can be prepared, as is known, from acids or esters of fatty material by hot hydrogenation and under pressure in the presence of a catalyst particularly active for reducing the carboxylic group of starting materials into a hydroxyl radical.

In known catalytic hydrogenation processes, the catalysts and operating conditions were such as to produce, further to the reduction of the carboxylic group, an important saturation of the double bonds which may exist in the starting materials.

From the industrial point of view, it has however been found very important to carry out a process giving, by hydrogenation of unsaturated fatty alcohols or their derivatives, high yields of unsaturated higher aliphatic alcohols. The surface-active synthesis products prepared from fractions rich in such alcohols, have indeed, for some uses, better properties than those of corresponding products prepared from saturated alcohols.

The various known methods are founded on the utilization of catalysts for the selective hydrogenation of carboxyl groups and/or on the application of special working conditions keeping up the double bonds. The economic results of such methods have not been satisfactory as, due to incomplete conversion of the starting materials or to the formation of important quantities of by-products, the yields of unsaturated higher alcohols were substantially low.

It has now been found that a hydrogenation catalyst comprising an intimate mixture or a combination of chromium oxide, zinc oxide and aluminum oxide, will allow the hydrogenation reaction to be selectively orientated to a complete reduction of carboxyl groups into hydroxyl radicals while keeping up all or substantially all of the double bonds which may exist in the starting materials. It seems that, in such a catalytic composition, the aluminum oxide has not only the known effect of promoting the hydrogenation of unsaturated bonds C=O, but also of inhibiting the saturation of the double bonds C=C.

The aluminum oxide particularly has this double action when it is incorporated into the catalytic composition in a quantity corresponding to at least 3% based on the weight of the zinc oxide. Many tests have shown that, in the working conditions generally used for hydrogenating fatty materials, a molar ratio of aluminum oxide/zinc oxide of between 1/18 and 1/14 (that is to say about 3.5 to 13.5% aluminum oxide based on the weight of zinc oxide) gave high yields of unsaturated higher aliphatic alcohols from corresponding fatty acids or their esters.

The inhibiting action of catalysts containing aluminum oxide, with respect to the saturation of the double bonds of such starting materials, is not influenced by the activation treatments to which such catalysts may be subjected. They may be previously reduced, e. g. at a temperature of 300–350° C. and under a pressure of 250–500 atmospheres, in a hydrogen current possibly diluted by a gas such as nitrogen or carbondioxide, inert with respect to catalytic compositions. They may also be used directly, the reduction being effected in the presence of hydrogen during the reaction.

As another form of activation, finely divided catalysts may be used, preferably on a suitable carrier, such as asbestos fibres, Kieselguhr, silica gel or active carbon.

While being very active and selective, the catalysts used in the process of the present invention need not be adapted to the kind of the raw materials to be hydrogenated. By this way, most starting products, such as unsaturated fatty acids, and the esters of such acids and of monovalent or polyvalent alcohols, may be treated in admixture or not with the corresponding saturated compounds. For hydrogenating free acids, it is however advantageous to effect the reaction in the presence of methanol in order to avoid a too rapid degradation of the catalysts and to reduce the corrosive effect of such acids on the apparatus.

In each particular case, the best conditions are of course dependent upon the material to be treated, but we have found that under hydrogen pressures between 200 and 400 atmospheres, the reaction is directed to the formation of higher alcohols. For stopping the reaction at that stage and avoiding the formation of by-products such as hydrocarbons and ethers, it is necessary to apply temperatures between 300 and 330° C. as well as volumetric speeds from 0.5 to 2 litres of raw material/hour/L. of catalyst.

The following examples, given by way of illustration but not of limitation, show how to prepare a catalyst, particularly zinc and alumina chromite, as well as how to use such catalyst in the hydrogenation process in accordance with the invention.

Example 1: Preparation of the catalyst 7 liters of distilled water are introduced into a 20 liter stainless steel vat in an air bath. 3,872 gr. zinc acetate, that is to say 17.64 mol. zinc acetate with 2 mol. water, are dissolved in this water. This solution is heated to 50° C. with the addition thereto of 1960 gr. chromic anhydride (that is to say 19.6 mol.), and thereafter 400 gr. aluminum acetate (or 1.96 mol.).

The mixture is agitated while being heated to 90° C. At a temperature of 100° C., granulated and carefully ash freed and desulfurated active carbon is then slowly introduced. This warming up and the stirring are carried on until substantially all the water present therein is eliminated.

The granules of active carbon, impregnated with zinc and alumina chromite, are then dried in a drying oven at a temperature of 110° C. in a nitrogen stream.

The analysis of the catalyst prepared this way is as follows:

|    | Percent |
|----|---------|
| Cr | 12.20   |
| Zn | 14.40   |
| Al | 0.52    | and thus:

$$\frac{Al_2O_3 + Z_nO}{Cr_2O_3} = 1$$

This catalylic mixture is then reduced with a gaseous stream comprising 75% by volume of hydrogen and 25% by vol. of nitrogen, at a temperature of 350° C. and a pressure of 500 atmospheres. However, the mixture can be directly used, the reduction being effected in the presence of hydrogen during the reduction reactions of the unsaturated fatty acids or their esters.

Example 2

1 liter of previously reduced catalyst prepared according to Example 1, is introduced into a steel tube capable of resisting high pressure and temperature and provided with a device for hydrogen admission under pressure and with a pump for introducing, at a constant rate of flow and a constant temperature, a mixture containing 38 parts by weight of methanol and 62 parts by weight of oleic acid with an iodine number of 85. The volumetric flow rate of the acid is 0.8 liter/hour/liter of catalyst.

The hydrogenation reaction is carried out under a hydrogen pressure of 375 atmospheres and at a temperature of 315° C. With such conditions, one gets a product having, after the elimination of methanol by flashing according to known processes, the following characteristics:

| | |
|---|---|
| Acid number | <0.1 |
| Saponification number | 0.2 |
| Hydroxyl number | 207 |
| Iodine number | 68 |

This analysis shows: (a) a substantially complete hydrogenation of the oleic acid into higher fatty alcohols, (b) the sparing of 75.5% of the double bonds which are present in the acid before hydrogenation.

Example 3

Tallow fatty acids with an iodine number of 55 were subjected to hydrogenation at 320° C., the other working conditions being identical to those of the preceding example. The resultant corresponding alcohols still had an iodine number of 42.

In the same conditions, but in the presence of a catalyst comprising chrome oxide and zinc oxide, without aluminum oxide, the corresponding alcohols with an iodine number of only 35 were obtained.

Example 4

According to the working process of Example 1, there has been prepared, mutatis mutandis, a catalyst having an aluminum oxide content corresponding to about 10% of the weight of the zinc oxide.

By hydrogenation according to Example 2, but at a temperature of 320° C., palm oil fatty acids with an iodine number of 18.5 have given corresponding alcohols the iodine number of which was 17, that is to say 86% of spared double bonds.

There will now be obvious to those skilled in the art many modifications of the processes described but which do not depart essentially from the spirit of the invention.

What is claimed is:

1. A method for producing unsaturated fatty alcohols comprising continuously hydrogenating a substance from the group consisting of unsaturated carboxyl aliphatic acids having a high molecular weight and the esters of said acids in the presence of a catalyst consisting of chrome oxide, zinc oxide and aluminum oxide, the aluminum oxide being between 3 and 13.5% by weight of the zinc oxide, the molecular proportion of aluminum and zinc oxides to chromium oxide being substantially equal to one.

2. A method as claimed in claim 1 comprising effecting the hydrogenating in a hydrogen pressure of from about 200–400 atmospheres.

3. A method as claimed in claim 1 comprising reacting said substance in a temperature range of from 300–330° centigrade.

4. A method as claimed in claim 1 comprising reacting .5–2 liters of said substance per hour per liter of catalyst.

References Cited in the file of this patent

UNITED STATES PATENTS

| | | |
|---|---|---|
| 2,094,127 | Lazier | Sept. 28, 1937 |
| 2,118,001 | Andrews et al. | May 17, 1938 |
| 2,265,641 | Grosskinsky et al. | Dec. 9, 1941 |
| 2,374,379 | Rittmeister | Apr. 24, 1945 |
| 2,375,495 | Richardson et al. | May 8, 1945 |
| 2,447,017 | Kearby | Aug. 17, 1948 |
| 2,468,363 | Jean | Apr. 26, 1949 |

FOREIGN PATENTS

| | | |
|---|---|---|
| 433,549 | Great Britain | Aug. 16, 1935 |

OTHER REFERENCES

Adkins et al.: J. A. C. S., vol. 59 (1937), pp. 1–3.